United States Patent [19]

Halters et al.

[11] Patent Number: 5,308,956
[45] Date of Patent: May 3, 1994

[54] APPLIANCE FOR THE PREPARATION OF MEAT OR SIMILAR PRODUCTS

[75] Inventors: Marinus A. M. Halters, Bavel; Adrianus S. Verwijmeren, Prinsenbeek, both of Netherlands

[73] Assignee: Fri-Jado B.V., Etten-Leur, Netherlands

[21] Appl. No.: 704,447

[22] Filed: May 23, 1991

[30] Foreign Application Priority Data

Jun. 27, 1990 [NL] Netherlands ............... 9001472

[51] Int. Cl.⁵ ............... A21B 1/00; F27D 7/04
[52] U.S. Cl. ................... 219/400; 126/21 R
[58] Field of Search ........... 219/400; 126/21 A, 21 R

[56]  References Cited

U.S. PATENT DOCUMENTS

| | | | |
|---|---|---|---|
| 3,828,760 | 8/1974 | Farber et al. | 219/400 |
| 4,286,456 | 9/1981 | Sisti | 219/400 |
| 4,481,396 | 11/1984 | Matsubayashi | 219/400 |
| 4,601,279 | 7/1986 | Guerin | 219/400 |
| 4,700,685 | 10/1987 | Miller | 219/400 |
| 4,780,596 | 10/1988 | Matsushima | 219/400 |
| 4,782,214 | 11/1988 | Voegtlin | 219/400 |
| 4,865,864 | 9/1989 | Rijswijck | 219/400 |
| 4,935,604 | 6/1990 | Allen | 219/400 |

FOREIGN PATENT DOCUMENTS

| | | |
|---|---|---|
| 0236150 | 9/1987 | European Pat. Off. . |
| 1579772 | 9/1970 | Fed. Rep. of Germany . |
| 3116057 | 3/1982 | Fed. Rep. of Germany . |
| 2312919 | 12/1976 | France . |
| 2548764 | 1/1985 | France . |
| 8303095 | 4/1985 | Netherlands . |

*Primary Examiner*—Geoffrey S. Evans
*Assistant Examiner*—John A. Jeffery
*Attorney, Agent, or Firm*—Bell, Seltzer, Park & Gibson

[57]  ABSTRACT

An appliance of the preparation of meat or similar products is disclosed, and which includes an outer casing, and an inner casing which is adapted to receive the food product. An air venting system is provided by which the inner casing may be closed and air tight, or opened so as to be in communication wit the outside air. A circulating fan and a heating element are positioned in the inner casing, and a control system is provided by which the appliance may be selectively operated in a cooking mode wherein the air venting system is closed, a grilling mode wherein the air venting system is open, and a hot maintenance mode wherein the air venting system is closed and the circulating fan and heating elements are operated at relatively low levels.

9 Claims, 1 Drawing Sheet

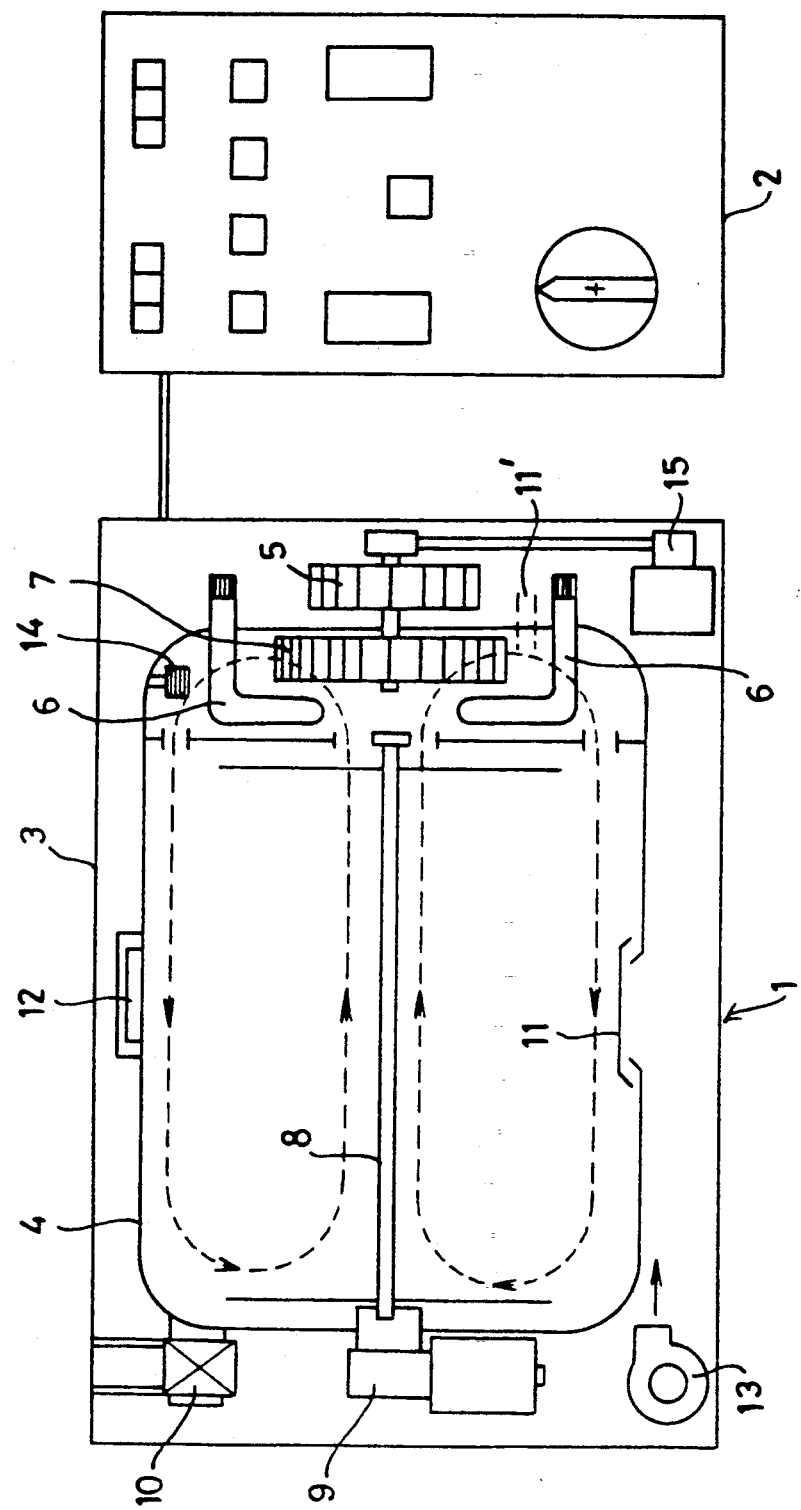

APPLIANCE FOR THE PREPARATION OF MEAT OR SIMILAR PRODUCTS

BACKGROUND OF THE INVENTION

The present invention relates to an appliance for the preparation of meat or similar products, comprising an outer and an inner casing, a fan for circulating cooling air in the space between the inner and outer casing, a separate space in the inner casing with heating elements and an air circulation fan set up in it, which space is in communication by means of air admission openings with the actual treatment space for the products, and in which space a holder for the product to be treated, such as a rotating spit, grille or the like, is set up, while drive means for the fans, the rotating spit and the like are set up in the space between the inner and outer casing.

Such an appliance is known from Dutch Patent Application No. 8303095. The meat grill described in this application works as follows. The outside of the meat is sealed by means of radiation, during which it acquires a brown color and possibly a crisp crust, and moisture loss is also prevented. Circulating hot air by means of a fan in the treatment space causes the meat present in this space to be cooked through. However, this meat grill has a number of disadvantages.

In the first place, cooking takes a relatively long time, since heat transfer to the meat is reduced as a consequence of the sealing of the outside and drying out thereof. In addition, when the door of such a meat grill is opened cooking odours will escape into the room in which said meat grill is located. This is particularly objectionable if such a meat grill is in a shopping arcade or the like.

SUMMARY OF THE INVENTION

The object of the present invention is to provide an appliance which does not have the above-mentioned disadvantages, while the grilling treatment of meat or the like is improved. The appliance according to the invention is to this end characterized in that:

a) the drive means of the air circulation fan is controllable;
b) the heating elements are controllable;
c) the inside space of the inner casing can be placed in communication with the environment by means of an air inlet and outlet; and
d) the space formed by the inner casing is shut off substantially leakproof from the environment;
e) these parts are connected to a control assembly which is designed:
  e1) for the purpose of cooking through the products to be treated, to convey the air kept at a desired temperature by the heating elements through the treatment space at a suitable speed in a closed circuit, with the air inlet and outlet shut off;
  e2) for the purpose of grilling, to open the air inlet and outlet, and to convey the air kept at a desired temperature by the heating elements at a suitable speed through the treatment space; and
  e3) for the purpose of keeping hot, to convey the air kept at a heat-retaining temperature by the heating elements at a suitable lower speed through the treatment space, with the air inlet and outlet shut off.

Since during cooking the space remains shut off and the same hot air is always conveyed along the meat to be prepared, the humidity of this air remains high. The surface of the meat consequently loses little moisture, as a result of which the heat transfer from the hot air to the meat is increased and a more rapid cooking than with the known meat grills is therefore obtained.

In addition, the controllability means that it becomes possible to treat all kinds of meat or other foods in the appliance according to the invention. The invention also has the advantage that for grilling the exhaust fan is switched on and the air inlet opened after cooking of the meat, so that the grill fumes can escape, for example through a chimney provided with a filter, and the moisture also escapes therewith. Through the escape of the moisture a more rapid sealing of the outer layer of the meat will occur, and the flavour will therefore be better retained. The crust thus formed is also firm and will not become soft by moisture from the treatment space itself. Due to the fact that the grilling time can be controlled, any desired degree of browning of the grilled products can be obtained. The appliance according to the invention further provides the possibility of keeping the separate meat hot in the space in which it is prepared, as a result of which the growth of bacteria is avoided. Keeping hot in the closed space has the advantage that the meat in the appliance retains a fresh appearance for a long time, which promotes the sale thereof.

The grill appliance according to the invention also has the advantage that it requires virtually no action at all from the user, since the component processes of the grill treatment and keeping hot state are regulated by a control assembly, which could be set by the manufacturer for different products to be grilled. This guarantees the quality and reproducibility of the grilled product.

The supply of cool air into the space between the inner and outer casing preferably takes place along the bottom side, and it is preferably controllable by means of the control assembly.

In this way the bottom side of the treatment space is cooled more than the top side, as a result of which fat spattered onto the bottom side will condense, instead of sticking on it and possibly carbonizing.

The invention will be explained below with reference to the appended drawing.

DESCRIPTION OF THE DRAWING

In the drawing the single figure shows schematically a practical embodiment of an appliance for grilling meat or the like according to the invention.

DESCRIPTION OF A PREFERRED EMBODIMENT

In the figure the grill section of the device is indicated by reference number 1, and reference number 2 indicates the control assembly, which could be a microprocessor which controls the entire process, and in the case of which, for example, the respective temperatures, times, fan speeds etc. can be set for a number of products, something which can also be carried out by the manufacturer.

The grill section 1 comprises an outer casing 3 and an inner casing 4. In the space between the outer casing 3 and the inner casing 4 a fan 5 is located for circulating cool air drawn in from outside through the above-mentioned space.

The inner casing 4 contains in a separate space heating elements 6 which heat the air in the inner casing 4, which air is circulated in the inner casing by means of an air circulating fan 7, in this practical embodiment, for example, in the direction of the dotted line arrows. Said fan 7 is driven by an electric motor 15. The inner casing 4 or the treatment space also contains a spit 8 which can, of course, be replaced by a grille, baking sheet or the like. This spit 8 is driven by an electric motor 9, which is situated in the space between the inner casing 4 and the outer casing 3.

The wall of the treatment space 4 also contains an exhaust fan 10 which can be in communication with, for example, a chimney containing, for example, a fat filter or the like, so that the discharged air is released in a clean state to the environment.

When the exhaust fan 10 is operating, an air inlet 11 is opened. This air inlet 11 can be designed in the form of a throttle valve, a so-called non-return valve, a magnet valve or a similar opening with a certain throughflow resistance.

Reference number 12 indicates a lamp serving solely to illuminate the treatment space, and not fulfilling any heating function.

Finally, the space between the inner casing 4 and the outer casing 3 contains a cooling air inlet 13 at the bottom lefthand side of said space, so that when fan 5 is in operation the supply of cool air into the intermediate space takes place along the bottom side of the treatment space 4. Fan 5 is driven by electric motor 15 and turns simultaneously with fan 7.

A temperature gauge 14 is provided in the treatment space in order to permit measurement of the temperature therein.

All parts, including fans 5, 7, heating elements 6, temperature gauge 14, exhaust fan 10, spit motor 9 and motor 15, are connected to the control assembly 2.

Reference number 11' in the figure indicates by dotted lines a valve which is operable by the control assembly 2 and which can be used instead of valve 11. In this case exhaust fan 10 can also be replaced by, for example, a pressure-sensitive shut-off valve. This valve can be of the same design as that described for valve 11. When air is to be conveyed into the treatment space during grilling valve 11' is opened and, by the action of fan 7, air is conveyed into the treatment space 4 and leaves the latter through the pressure-sensitive shut-off valve. It is found that the supply of air near the heating elements 6 has a very beneficial effect on the quantity and intensity of the strong-smelling cooking odours. In some cases the cooking odours leaving the treatment space are then virtually free of the undesirable smell of burnt fat etc.

EXAMPLE

An example will now be given of a process for grilling chicken.

For this, chickens are fixed on the spit 8, and the door of the appliance is then closed and the control assembly switched on. First of all, the chickens are cooked through, during which time fan 7 rotates at high speed, and the temperature is kept at the desired level, generally 180° C., by means of heating elements 6 and temperature gauge 14. After approximately 25 min the exhaust fan 10 is turned on by the control assembly and the air inlet 11 is opened. The fan 10 continues to rotate at the same speed, but the temperature is increased by means of the heating elements 6 and temperature gauge 14 to approximately 250° C. This grilling takes about 10 min, during which period cooking through naturally continues. After this the chickens are sealed and brown.

After grilling has been completed, the chickens must be kept hot. For this, the exhaust fan 10 is switched off, and the air inlet valve is closed. The fan 7 is driven at a lower speed, while the temperature is set at approximately 80° C. with the aid of heating elements 6 and the temperature gauge 14.

The spit turns during the entire above-mentioned operation.

If desired, the air inlet 13 can be replaced by a cooling fan which is switched on at certain temperatures, for example 90° C., of the intermediate space, in order to ensure additional cooling of said space.

Keeping the chickens hot in the same space as that in which they have been grilled gives the consumer the impression that the chickens have just been grilled, an optical effect which is advantageous.

A major advantage of the appliance according to the invention is that the amount of energy required per unit weight of product to be prepared is lower than in the case of appliances according to the prior art, so that a considerable energy saving is obtained. The time taken for the preparation of the product, such as, for example, chicken or the like is also approximately halved.

What is claimed is:

1. An appliance for the preparation of meat or other food products, comprising
   an outer casing,
   an inner casing positioned within said outer casing so as to define a space therebetween,
   air venting means which is movable between a closed position wherein said inner casing is substantially air tight and an open position wherein the interior of said inner casing is in communication with the environment outside of said outer casing,
   means positioned in said inner casing for supporting a food product,
   an air circulating fan rotatably mounted in said inner casing, and a drive motor for rotating said air circulating fan,
   a heating element mounted in said inner casing, and control mans for selectively
   (1) moving said air venting means between said closed and open positions;
   (2) controlling the operating speed of said drive motor between at least two predetermined operating speeds; and
   (3) controlling the temperature of said heating means between at least two predetermined operating temperatures.

2. The appliance as define in claim 1 wherein said air venting means comprises air inlet opening means and separate air outlet opening means.

3. The appliance as defined in claim 2 wherein said pair outlet means includes an exhaust fan for drawing air through said inner casing when said air venting means is in said open position, and said control means further comprises means or selectively operating said exhaust fan.

4. The appliance said defined in claim 2 further comprising a cooling fan rotatably mounted in said space between said outer casing and said inner casing, and means for operatively connecting said cooling fan to said drive motor such that said air circulating fan and said cooling fan are commonly driven.

5. The alliance as defined in claim 4 wherein said air inlet opening means includes an opening in said inner casing which is positioned adjacent said cooling fan, and said control means includes means for selectively opening and closing said opening.

6. The appliance as defined in claim 4 wherein said inner casing includes a transverse wall which divides the interior of said inner casing into a first portion which has said product supporting means therein, and a second portion which has said air circulating fan therein, and wherein said transverse wall includes openings which permit air to be circulated by said air circulating fan between said first and second portions.

7. The appliance as defined in claim 1 wherein said outer casing includes a bottom wall, and said air venting means includes an opening in said outer casing positioned so that air is adapted to move through the portion of said space between said bottom wall and said inner casing.

8. The appliance as defined in claim 1 wherein said product supporting means comprises a rotatable spit, and a drive motor for rotating said spit.

9. An appliance for the preparation of meat or other food products, comprising an otuer casing, an inner casing positioned within said outer casing so as to define a space therebetween, and with said inner casing including a traverse wall which divides the interior of said inner casing into a first portion, and a second portion, and wherein said transverse wall includes openings which permit air of circulate between said first and second portions, air venting means which is movable between a closed position wherein said inner casing is substantially air tight and an open position wherein the interior of said inner casing is in communication with the environment outside of said outer casing, said air venting mean comprising in inlet opening means nd separate air outlet opening means, and an exhaust fan for drawing air through said inner casing when said air venting means is in said open position, means positioned in said first portion of said inner casing or supporting a food product, an air circulating fan rotatably mounted in said second potion of said inner casing, and a drive motor for rotating said air circuiting fan, a cooling fan rotatably mounted in said space between said outer casing and said inner casing, and means of operatively connecting said cooling fan to said drive motor such that said air circulating fan and said cooling fan are commonly driven, a heating element mounted in said second portion of said inner casing, and control means or selectively
  (1) moving said air venting means between said closed an open positions;
  (2) controlling the operating speed of said drive motor between at least two predetermined operating speeds;
  (3) controlling the temperature of said heating means between at least two predetermined operating temperatures, and
  (4) controlling the operation of said exhaust fan.

* * * * *

UNITED STATES PATENT AND TRADEMARK OFFICE
CERTIFICATE OF CORRECTION

PATENT NO. : 5,308,956 Page 1 of 2

DATED : May 3, 1994

INVENTOR(S) : Halters, et al.

It is certified that error appears in the above-identified patent and that said Letters Patent is hereby corrected as shown below:

Title page, item [57],
In the Abstract, line 6, delete "wit" and insert --with-- therefor.

Column 4, line 40, delete "and".

Column 4, line 40, after "casing" insert
--said appliance having at least two modes of operation wherein in each mode said air venting means is positioned in a selected one of said positions, said drive motor operates said fan at a selected operating speed and said heating element is operated at a selected operating temperature, wherein in a selected mode, at least one of the vent positions, motor speed, and operating temperature is different than in the other modes of operation,
control means for selecting one of said modes of operation whereby the proper vent position, motor speed, and temperature for the mode is automatically provided.--

Column 4, delete lines 41-49.

Column 4, line 54, delete "pair" and insert --air-- therefor.

Column 5, line 25, delete "traverse" and insert --transverse-- therefor.

Column 5, line 29, delete "of" and insert --to-- therefor.

Column 6, line 4, delete "in" and insert --air--, and delete "nd" and insert --and-- therefor.

UNITED STATES PATENT AND TRADEMARK OFFICE
CERTIFICATE OF CORRECTION

PATENT NO. : 5,308,956
DATED : May 3, 1994
INVENTOR(S) : Halters, et al.

It is certified that error appears in the above-identified patent and that said Letters Patent is hereby corrected as shown below:

Column 6, line 15, delete "of" and insert --for-- therefor.

Column 6, line 19, delete "and".

Column 6, line 19, after "casing" insert --said appliance having at least two modes of operation wherein in each mode said air venting means is positioned in a selected one of said positions, said drive motor operates said fan at a selected operating speed and said heating element is operated at a selected operating temperature, wherein in a selected mode, at least one of the vent positions, motor speed, and operating temperature is different than in the other modes of operation,
    control means for selecting one of said modes of operation whereby the proper vent position, motor speed, and temperature for the mode is automatically provided.--

Column 6, delete lines 20-29.

Signed and Sealed this

Fourteenth Day of January, 1997

Attest:

BRUCE LEHMAN

Attesting Officer      Commissioner of Patents and Trademarks